US009389939B2

(12) United States Patent
Miyamoto et al.

(10) Patent No.: US 9,389,939 B2
(45) Date of Patent: Jul. 12, 2016

(54) INFORMATION PROCESSING APPARATUS WITH ERROR VERIFICATION INCLUDING ERROR PROCESSING OR TRANSFERRING AGAIN BASED ON A CODE COINCIDING WITH CODES DEFINED BY AN INTERFACE COMMUNICATION STANDARD

(71) Applicant: KYOCERA Document Solutions Inc., Osaka-shi, Osaka (JP)

(72) Inventors: Naruyuki Miyamoto, Osaka (JP); Tomoyuki Kikuta, Osaka (JP); Takashi Inoue, Osaka (JP); Tetsuya Matsusaka, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 191 days.

(21) Appl. No.: 14/223,281

(22) Filed: Mar. 24, 2014

(65) Prior Publication Data

US 2014/0298118 A1 Oct. 2, 2014

(30) Foreign Application Priority Data

Mar. 26, 2013 (JP) ................................ 2013-064738

(51) Int. Cl.
*G06F 11/07* (2006.01)
*G06F 9/22* (2006.01)

(52) U.S. Cl.
CPC ........ *G06F 11/0769* (2013.01); *G06F 11/0733* (2013.01); *G06F 11/0766* (2013.01); *G06F 11/0793* (2013.01); *G06F 9/226* (2013.01)

(58) Field of Classification Search
CPC . G06F 11/0727; G06F 11/0793; G06F 9/268; G06F 9/223; G06F 9/226; G11B 20/0092; G11B 20/00927; G11B 20/00963
See application file for complete search history.

(56) References Cited

U.S. PATENT DOCUMENTS 5,796,972 A * 8/1998 Johnson .................... G06F 8/66 712/208
6,157,948 A * 12/2000 Inoue ........................ G06F 8/61 382/232

(Continued)

FOREIGN PATENT DOCUMENTS

JP 2005092497 A 4/2005
JP 2009267660 A 11/2009

*Primary Examiner* — Joseph Schell
(74) *Attorney, Agent, or Firm* — Alleman Hall McCoy Russell & Tuttle LLP

(57) ABSTRACT

An information processing apparatus according to one aspect of the present disclosure includes a communication control portion, an error code storage portion, an acquiring portion, and a determination portion. Communication control portion communicates with storage device based on interface communication standard, to perform data transfer therewith. Error code storage portion stores one or a plurality of selected error codes selected from a plurality of error codes defined by interface communication standard. Acquiring portion acquires error information outputted from storage device. Determination portion determines whether or not error code indicated by error information coincides with selected error code. When determination portion determines that error code coincides with selected error code, communication control portion communicates again with storage device to perform data transfer therewith. When determination portion determines that error code does not coincide with selected error code, communication control portion executes error processing corresponding to error code indicated by error information.

5 Claims, 3 Drawing Sheets

(56) References Cited

U.S. PATENT DOCUMENTS 6,256,738 B1 * 7/2001 Sinquin ............ G11B 20/00086 713/194
6,442,707 B1 * 8/2002 McGrath ................... G06F 9/32 712/244
7,418,618 B2 * 8/2008 Huang ...................... G06F 8/60 714/2
9,262,270 B2 * 2/2016 Jayaprakash Bharadwaj .......... G06F 11/1415
9,317,357 B2 * 4/2016 Coronado ............. G06F 11/079
2005/0058079 A1 * 3/2005 Utsunomiya ....... G06F 11/0793 370/242
2006/0277445 A1 * 12/2006 Kano .................. G06F 11/0727 714/42
2008/0056424 A1 * 3/2008 Chang ................... H04L 7/0083 375/371
2011/0107137 A1 * 5/2011 Lam .................... G06F 11/0748 714/4.4
2012/0023379 A1 * 1/2012 Kai ..................... G06F 11/0727 714/57

* cited by examiner

INFORMATION PROCESSING APPARATUS WITH ERROR VERIFICATION INCLUDING ERROR PROCESSING OR TRANSFERRING AGAIN BASED ON A CODE COINCIDING WITH CODES DEFINED BY AN INTERFACE COMMUNICATION STANDARD

INCORPORATION BY REFERENCE

This application is based upon and claims the benefit of priority from the corresponding Japanese Patent Application No. 2013-064738 filed on Mar. 26, 2013, the entire contents of which are incorporated herein by reference.

BACKGROUND

The present disclosure relates to an information processing apparatus which communicates with a storage device to perform data transfer based on a predetermined interface communication standard, and an error processing method for an error code reported from the storage device upon the data transfer.

An image forming apparatus such as a copy machine, a printer, or a facsimile compresses inputted image data and temporarily stores the compressed data into a storage device, and then expands the compressed data read again from the storage device and executes image forming processing based on the expanded image data. In addition, an image reading apparatus such as a scanner provided on a copy machine, a facsimile, or the like compresses read image data and stores the compressed data into a storage device, and then, when a readout command has been inputted, reads out the compressed data from the storage device and expands the compressed data.

Conventionally, a hard disk storage device (hereinafter, referred to as an "HDD" is used as the storage device. Data transfer with an HDD is performed based on an interface standard such as Serial-ATA interface. Generally, the interface standard specifies that, when an error (abnormality) occurs in an HDD or a connection port or when a transfer error occurs, an error code indicating the content or the status of the error that occurs is reported, and a plurality of error codes are prepared.

Even in the case where no error occurs in an HDD, when noise is applied from outside to an apparatus having the HDD, a bit error may occur on a response signal from the HDD, so that an error code indicating that an error occurs may be reported. Particularly, in an image processing apparatus such as an image forming apparatus or an image reading apparatus which handles a sheet material such as a recording sheet or a document sheet which is likely to store static electricity, static electricity is likely to occur. Therefore, noise due to static electricity is likely to be applied to the HDD through a communication cable or a frame. Therefore, even though an error does not actually occur, an error code is reported from the HDD to a control portion of the image processing apparatus. Conventionally, a technique is known in which, when an error code is thus reported erroneously, whether or not an error actually occurs is checked. This conventional technique is a processing technique in which, when an error code is reported from an HDD, retry processing (rewrite processing) for the HDD is performed within an upper limit number of times, and then if writing by the retry processing has not been successfully performed within the upper limit number of times, it is determined that an HDD error occurs.

In the conventional technique, whether or not the error code is erroneously reported, retry processing is always performed when an error code is reported. Therefore, in the case where an error code is normally reported, unnecessary retry processing is performed, whereby time is unnecessarily wasted, and also, execution of error processing corresponding to the error code is delayed. In addition, under the condition that communication between the control portion and the HDD of the apparatus may be delayed, a long time is wasted for retry processing, so that a time-out error occurs and the retry processing itself is failed, and also, there is a possibility that processing corresponding to the error code cannot be executed.

SUMMARY

An information processing apparatus according to one aspect of the present disclosure includes a communication control portion, an error code storage portion, an acquiring portion, and a determination portion. The communication control portion communicates with a storage device based on a predetermined interface communication standard, to perform data transfer therewith. The error code storage portion stores one or a plurality of selected error codes selected from a plurality of error codes defined by the interface communication standard. The acquiring portion acquires error information outputted from the storage device. The determination portion determines whether or not an error code indicated by the error information acquired by the acquiring portion coincides with the selected error code stored in the error code storage portion. When the determination portion determines that the error code coincides with the selected error code, the communication control portion communicates again with the storage device to perform the data transfer therewith. When the determination portion determines that the error code does not coincide with the selected error code, the communication control portion executes error processing corresponding to the error code indicated by the error information.

An error processing method according to another aspect of the present disclosure includes first to fourth steps. The first step acquires error information outputted from a storage device capable of communication based on a predetermined interface communication standard. The second step determines whether or not an error code indicated by the error information acquired in the first step coincides with one or a plurality of selected error codes selected from a plurality of error codes defined by the interface communication standard. The third step, when the second step determines that the error code coincides with the selected error code, communicates again with the storage device to perform data transfer therewith. The fourth step, when the second step determines that the error code does not coincide with the selected error code, executes error processing corresponding to the error code indicated by the error information.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
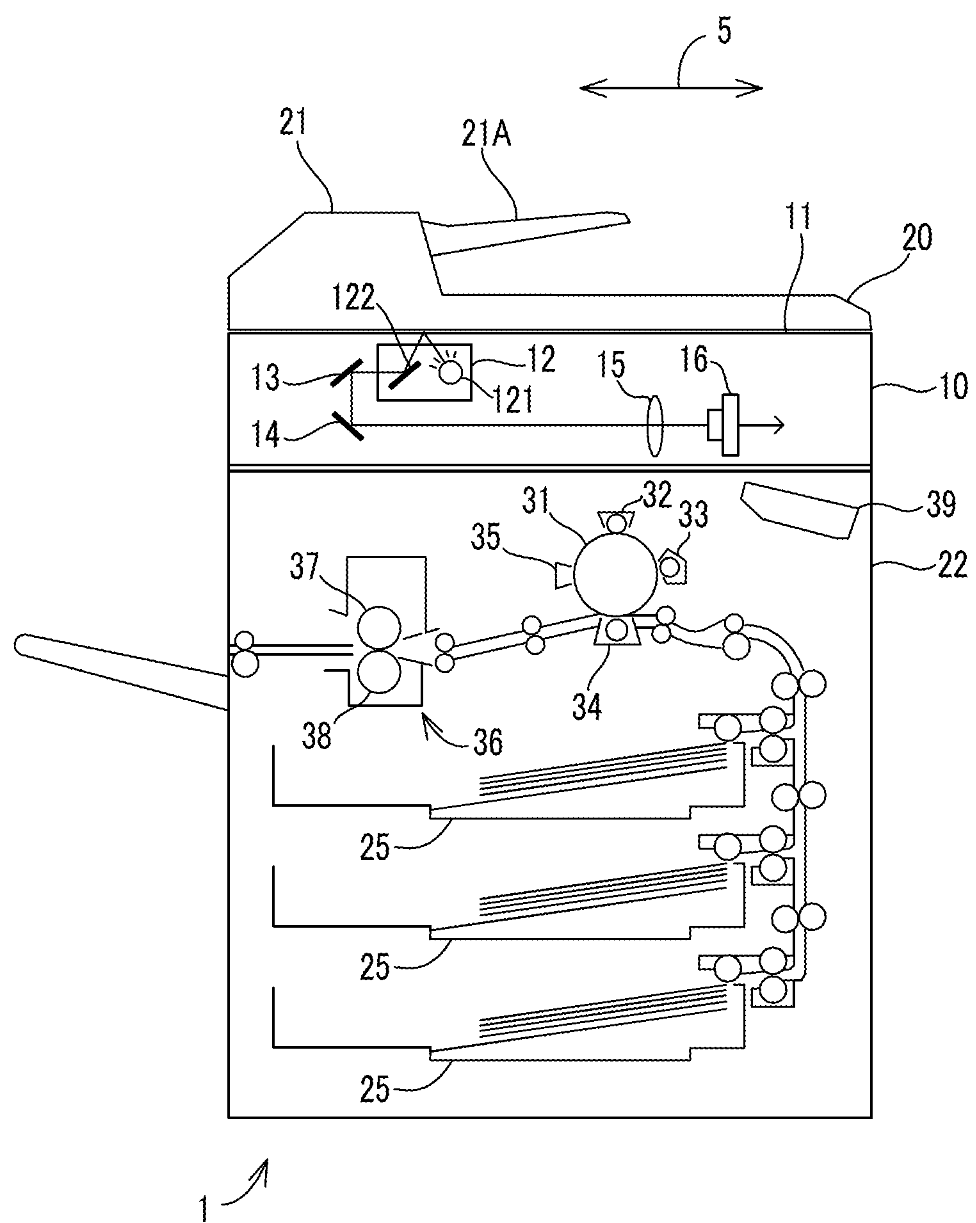
FIG. 1 is a schematic diagram showing the structure of a multifunction peripheral according to an embodiment of the present disclosure.

Hereinafter, an embodiment of the present disclosure will be described by referring to the drawings as necessary. It is noted that the following embodiment is merely an example in which the present disclosure is embodied, and therefore does not limit the technical scope of the present disclosure.

[Schematic Configuration of Multifunction Peripheral 1]

First, with reference to FIG. 1, the schematic configuration of a multifunction peripheral 1 (an example of an information processing apparatus) according to the embodiment of the present disclosure will be described.

Figure 2:
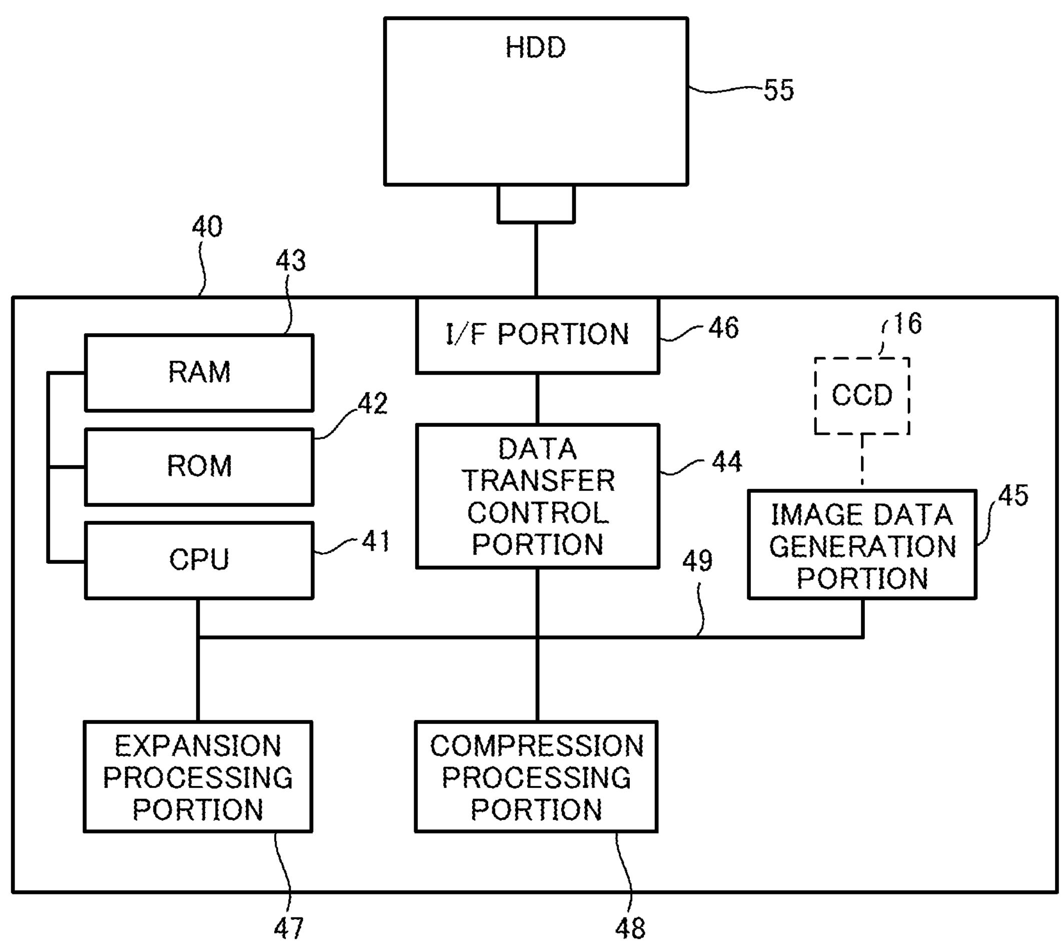
FIG. 2 is a block diagram showing the system configuration of a main control portion of the multifunction peripheral according to the embodiment of the present disclosure.

As shown in FIG. 1, the multifunction peripheral 1 is an image forming apparatus having functions such as a printer, a copy machine, and a facsimile. The multifunction peripheral 1 prints an image on a sheet material such as a print sheet by using a developer such as toner, based on inputted image data. The multifunction peripheral 1 includes an image reading portion 10 for reading an image of a document, which is provided at an upper portion thereof, and an image forming portion 22 of an electrophotographic type, which is provided at a lower portion thereof. In addition, inside the multifunction peripheral 1, as shown in FIG. 2, a main control portion 40 for controlling operation of the multifunction peripheral 1, and an HDD 55 (an example of a storage device) which is a hard disk storage device for storing image data, are provided.

[Image Reading Portion 10]

The image reading portion 10 includes a contact glass 11 forming a document placement surface, and a document cover 20 which opens or closes with respect to the contact glass 11. After a document is set on the contact glass 11 and the document cover 20 is closed, when a copy start instruction is inputted from an operation panel (not shown), a reading operation by the image reading portion 10 is started, whereby image data of the document is read. Inside the image reading portion 10, optical devices are provided such as a reading unit 12 including an LED light source 121 and a mirror 122, mirrors 13 and 14, an optical lens 15, and a CCD 16. The reading unit 12 is moved in a secondary scanning direction 5 by a motor or the like, light radiated from the LED light source 121 toward the contact glass 11 scans in the secondary scanning direction 5 during the movement, and the reflected light is inputted to the CCD 16. Thus, an image of a document on the contact glass 11 is read. The image data thus read is subjected to predetermined image processing, and then stored into the HDD 55.

It is noted that the document cover 20 is provided with an ADF 21. The ADF 21 sequentially conveys a plurality of documents set on the document set portion 21A by a plurality of conveying rollers (not shown), and moves each document so as to pass through a reading position set on the contact glass 11 rightward in the secondary scanning direction 5. During the movement of the document by the ADF 21, the reading unit 12 is located under the reading position, and an image of the moving document is read at this position by the reading unit 12.

[Image Forming Portion 22]

The image forming portion 22 executes image forming processing (print processing) by an electrophotographic method, based on image data read by the image reading portion 10 or image data inputted from an external information processing apparatus. As shown in FIG. 1, the image forming portion 22 includes a sheet feed cassette 25, a photosensitive drum 31, a charging device 32, a developing device 33, a transfer device 34, an electricity removing device 35, a fixing device 36, an exposure device 39, and the like. In the present embodiment, the image forming portion 22 of an electrophotographic type will be described as an example. However, the image forming portion 22 is not limited to an electrophotographic type, but may be an ink jet recording type, or may be other recording types or printing types.

In the image forming portion 22, image forming processing for a print sheet fed from the sheet feed cassette 25 is performed by the following procedure. First, an image forming instruction is inputted, whereby the charging device 32 uniformly charges the photosensitive drum 31 at a predetermined potential. Next, light based on image data is radiated to the surface of the photosensitive drum 31 by the exposure device 39. Thus, an electrostatic latent image is formed on the surface of the photosensitive drum 31. The electrostatic latent image on the photosensitive drum 31 is developed (visualized) as a toner image by the developing device 33. It is noted that toner (developer) is supplied from a toner container to the developing device 33. Subsequently, the toner image formed on the photosensitive drum 31 is transferred onto the print sheet by the transfer device 34. Thereafter, when the print sheet passes between a fixing roller 37 and a pressurizing roller 38 of the fixing device 36 and then is discharged, the toner image transferred onto the print sheet is heated by the fixing roller 37, thereby to be melt and fixed. It is noted that the potential of the photosensitive drum 31 is removed by the electricity removing device 35.

[System Configuration of Main Control Portion 40]

Next, with reference to FIG. 2, the system configuration of the main control portion 40 will be described. As shown in FIG. 2, the main control portion 40 includes a CPU 41, a ROM 42, a RAM 43, a data transfer control portion 44, an image data generation portion 45, an HDD interface portion 46 (hereinafter, referred to as an "I/F portion 46"), an expansion processing portion 47, a compression processing portion 48, a bus 49, and the like. The bus 49 is a transmission path used for transmission of data among the CPU 41, the data transfer control portion 44, the image data generation portion 45, the I/F portion 46, the expansion processing portion 47, and the compression processing portion 48.

The CPU 31 performs overall control for the multifunction peripheral 1 by executing a predetermined control program stored in the ROM 32. For example, the CPU 31 executes image reading processing by the image reading portion 10, image forming processing by the image forming portion 22, or the like. In addition, the CPU 31 controls the data transfer control portion 44 to perform data transfer of image data generated by the image data generation portion 45 as described later, to or from the HDD 55 via the I/F 46. Here, the data transfer refers to processing of writing image data into the HDD 55 or processing of reading out image data from the HDD 55.

The data transfer control portion 44, the image data generation portion 45, the expansion processing portion 47, the compression processing portion 48, and the I/F portion 46 are integrated circuits such as ASIC.

The data transfer control portion 44 is an example of a communication control portion, and controls reading and writing of data with respect to the HDD 55. Specifically, processing (processing of reading or writing) of transferring, to the HDD 55, image data to be subjected to image processing by the expansion processing portion 47 and the compression processing portion 48, is executed via the data transfer control portion 44. In the present embodiment, the data transfer control portion 44 performs the data transfer by communicating with the HDD 55 based on Serial-ATA (Serial Advanced Technology Attachment) which is an interface communication standard. In addition, the data transfer control portion 44 also executes data transfer between the image data generation portion 45 and the compression processing portion 48, data transfer between the compression processing portion 48 and the I/F 46, data transfer between the I/F 46 and the expansion processing portion 47, and the like.

The image data generation portion 45 generates image data in a predetermined format, based on an electric signal obtained by photoelectric conversion, which is sent from the CCD 16. In addition, the image data generation portion 45 performs various types of image processing such as shading correction and gamma correction for the generated image data. The generated image data is temporarily stored into an SDRAM (not shown) provided in the image data generation portion 45, and then transferred to the compression processing portion 48.

The compression processing portion 48 compresses the image data generated by the image data generation portion 45. Specifically, the compression processing portion 48 executes compression processing of reading out image data by a predetermined amount each time from the SDRAM of the image data generation portion 45 and compressing the read data by a JBIG method or a JPEG method. The image data (also referred to as compressed data) after the compression processing is transferred via the I/F 46 to the HDD 55 by the data transfer control portion 44, and then written into a storage area of the HDD 55.

The expansion processing portion 47 expands the compressed data read out from the HDD 55 by the data transfer control portion 44, into the image data before the compression. Specifically, the expansion processing portion 47 executes processing of reading out the compressed data by a predetermined amount each time from the HDD 55 and expanding the read data into the original image data. The expanded image data is transferred to the image forming portion 22, and then used for the image forming processing.

The I/F 46 is an interface for establishing connection to enable communication with the HDD 55 in accordance with Serial-ATA. Upon writing image data into the HDD 55, the I/F 46 receives image data from the data transfer control portion 44 and passes the image data to the HDD 55. In addition, upon reading out image data from the HDD 55, the I/F 46 receives image data from the HDD 55 and passes the image data to the data transfer control portion 44.

[HDD 55]

The HDD 55 is a nonvolatile storage device compliant with Serial-ATA, and is a magnetic disk device or an optical disc device. As a matter of course, the HDD 55 may be a device including another type of storage medium. It is noted that although the HDD 55 is exemplified as a storage device in the present embodiment, instead of the HDD 55, a storage device such as a memory card, a CD (Compact Disk) drive, or a DVD (Digital Video Disk) drive may be applied as long as image data and the like can be read and written by communication based on Serial-ATA.

The ROM 42 stores, besides the control program, a selected error code relevant to the HDD 55. The ROM 42 realizes an error code storage portion of the present disclosure. The selected error code is a specific error code selected from a plurality of error codes defined by Serial-ATA.

Table 1 shows an example of error codes defined by Serial-ATA. In Table 1, as errors relevant to an interrupt status (PxIS: Port x Interrupt Status) in a connection port for the HDD 55, errors of statuses of various items such as Task File Error, Host Bus Fatal Error, Host Bus Data Fatal Error, Interface Fatal Error, Overflow, and Incorrect Port Multiplier, are shown. It is noted that the errors shown in Table 1 are merely an example.

TABLE 1

Offset 10h PxIS-Port x Interrupt Status

| Bit No. | ERROR CORD | Description |
|---|---|---|
| 30 | RWC 0 Task File Error Status (TFES) | This bit is set whenever the status register is updated by the device and the error bit (bit 0 of the Status field in the received FIS) is set. |
| 29 | Host Bus Fatal Error Status (HBFS) | Indicates that the HBA encountered a host bus error that it cannot recover from, such as a bad software pointer. In PCI, such an indication would be a target or master abort. |
| 28 | Host Bus Data Error Status (HBDS) | Indicates that the HBA encountered a data error (uncorrectable ECC/parity) when reading from or writing to system memory. |
| 27 | Interface Fatal Error Status (IFS) | Indicates that the HBA encountered an error on the Serial ATA interface which caused the transfer to stop. Refer to section 6.1.2. |
| 26 | Interface Non-fatal Error Status (INFS) | Indicates that the HBA encountered an error on the Serial ATA interface but was able to continue operation. Refer to section 6.1.2. |
| 25 | | Reserved |
| 24 | Overflow Status (OFS) | Indicates that the HBA received more bytes from a device than was specified in the PRD table for the command. |
| 23 | Incorrect Port Multiplier Status (IPMS) | Indicates that the HBA received a FIS from a device that did not have a command outstanding. The IPMS bit may be set during enumeration of devices on a Port Multiplier due to the normal Port Multiplier enumeration process. It is recommended that IPMS only be used after enumeration is complete on the Port Multiplier. IPMS is not set when an asynchronous notification is received (a Set Device Bits FIS with the Notification 'N' bit set to '1'). |
| 22 | PhyRdy Change Status (PRCS) | When set to '1' indicates the internal PhyRdy signal changed state. This bit reflects the state of PxSERR.DIAG.N. To clear this bit, software must clear PxSERR.DIAG.N to '0'. |

In addition, Table 2 shows another example of error codes defined by Serial-ATA. In table 2, as errors (PxSERR: Port x Serial ATA Error) relevant to Serial-ATA communication in a connection port for the HDD 55, errors of statuses of various items such as Exchanged, Unknown FIS Type, Transport state Transition Error, Link Sequence Error, Handshake Error, CRC Error, Disparity Error, 10B-to-8B Decode Error, Comm Wake, Phy Internal Error, and PhyRdy Change, are shown. It is noted that the errors shown in Table 2 are merely an example.

TABLE 2

Offset 30h: PxSERR-Port x Serial ATA Error (SCR1: SError)

| Bit No. | ERROR CORD | Description |
|---|---|---|
| 26 | Exchanged (X) | When set to one this bit indicates that a change in device presence has been detected since the last time this bit was cleared. The means by which the implementation determines that the device presence has changed is vendor specific. This bit shall always be set to one anytime a COMINIT signal is received. This bit is reflected in the PxIS.PCS bit. |
| 25 | Unknown FIS Type (F) | Indicates that one or more FISs were received by the Transport layer with good CRC, but had |

TABLE 2-continued

| Offset 30h: PxSERR-Port x Serial ATA Error (SCR1: SError) | | |
|---|---|---|
| Bit No. | ERROR CORD | Description |
| | | a type field that was not recognized/known. |
| 24 | Transport state transition error (T) | Indicates that an error has occurred in the transition from one state to another within the Transport layer since the last time this bit was cleared. |
| 23 | Link Sequence Error (S) | Indicates that one or more Link state machine error conditions was encountered. The Link Layer state machine defines the conditions under which the link layer detects an erroneous transition. |
| 22 | Handshake Error (H) | Indicates that one or more R_ERR handshake response was received in response to frame transmission. Such errors may be the result of a CRC error detected by the recipient, a disparity or 8b/10b decoding error, or other error condition leading to a negative handshake on a transmitted frame. |
| 21 | CRC Error(C) | Indicates that one or more CRC errors occurred with the Link Layer. |
| 20 | Disparity Error (D) | This field is not used by AHCI. |
| 19 | 10B to 8B Decode Error (B) | Indicates that one or more 10B to 8B decoding errors occurred. |
| 18 | Comm Wake (W): | Indicates that a Comm Wake signal was detected by the Phy. |
| 17 | Phy Internal Error (I) | Indicates that the Phy detected some internal error. |
| 16 | PhyRdy Change (N) | Indicates that the PhyRdy signal changed state. This bit is reflected in the PxIS.PRCS bit. |

The errors shown in Table 1 and Table 2 are assigned with Bit numbers (Bit No.) as identifiers for identifying the respective errors. The error code is a combination of the content of an error and the bit number, and for example, is represented as PxSERR#21. In addition, error information indicating the error status of the error code is a combination of the content of an error, the bit number, and 1-bit information indicating the status of the error content. That is, the error information corresponds to the error code to which the 1-bit information has been added. For example, in the case where a portion corresponding to the 1-bit information is “0”, this indicates not an error state but a normal state, and in the case of “1”, this indicates an error state. In the present embodiment, among the errors shown in Table 1 and Table 2, PxSERR#21, PxSERR#19, and PxSERR#16 are set as the selected error codes. That is, the error codes of PxSERR#21, PxSERR#19, and PxSERR#16 are the selected error codes, and these pieces of information are stored in the ROM 42. With regard to these selected error codes, the applicant of the present application has repeatedly conducted experiments about noise due to static electricity to the multifunction peripheral 1, and as a result, it has been found that, when the static electricity has been transferred to the HDD 55, a bit error occurs, so that the 1-bit information indicating the error status is rewritten.

Here, CRC Error of PxSERR#21 (bit number 21) is an error in a CRC (Cyclic Redundancy Check) which is an error detection method for a frame (which is called a packet) which is one unit for transfer of image data. When the HDD 55 has received a frame with this error, the HDD 55 discards the frame. In addition, 10B-to-8B Decode ERROR of PxSERR#19 (bit number 19) is an error of encode from 10 bit to 8 bit. In addition, PHYRDY Change of PxSERR#16 (bit number 16) renders, as an error, change in PHYRDY state (physical layer ready state) which indicates that the HDD 55 is ready to be read and written. None of these errors is fatal for the HDD 55. Therefore, in the case where an error indicated by any of these selected error codes is reported from the HDD 55, the data transfer control portion 44 does not perform original error processing but performs later-described error recovery processing for enabling data transfer with the HDD 55.

Figure 3:
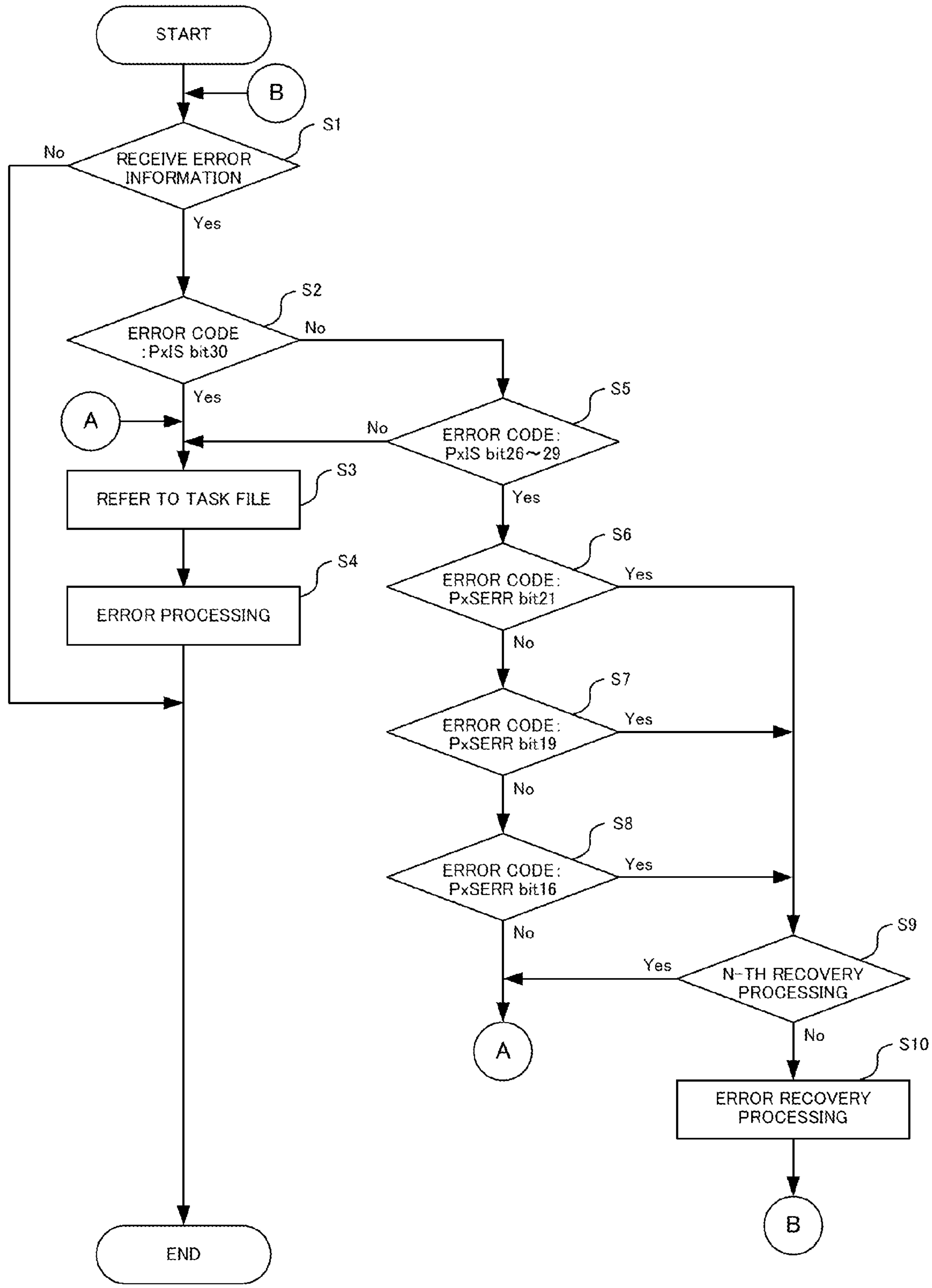
FIG. 3 is a flowchart showing an example of a procedure of error processing executed by the main control portion.

Hereinafter, with reference to FIG. 3, examples of error processing and an error processing method executed by the data transfer control portion 44 will be described. It is noted that an acquiring portion and a determination portion of the present disclosure are realized by the following error processing being performed.

First, in the case of performing data transfer with respect to the HDD 55 based on Serial-ATA, the data transfer control portion 44 performs initial processing of establishing communication with the HDD 55, prior to the data transfer. Then, after the communication is established, transfer processing for data is performed. While the initial processing and the data transfer processing are being performed, error information including the error code and the error status (1-bit information) is sent together with a response signal from the HDD 55. In step S1 (first step), the data transfer control portion 44 receives the error information and determines whether or not bit information that indicates an error (hereinafter, referred to as “error bit information”) is present. Specifically, the data transfer control portion 44 determines whether or not a bit value in the error bit information is “1”. Here, if it has been determined that the error bit information is present, the process proceeds to the next step S2. It is noted that if the error bit information is not included in the response signal from the HDD 55, that is, if the bit value is “0”, the error processing is ended and data transfer with the HDD 55 is performed.

In step S2, the data transfer control portion 44 determines whether or not the error code included in the error information is PxIS#30. Here, if the error code is PxIS#30, a task file is referred to and error processing corresponding to the error content of the error code is executed (S3, S4). On the other hand, if the error code is not PxIS#30, the process proceeds to step S5.

In step S5, the data transfer control portion 44 determines whether or not the error code is one of PxIS#26 to PxIS#29. Here, if the error code is one of PxIS#26 to PxIS#29, the process proceeds to step S6. On the other hand, if the error code is not any one of PxIS#26 to PxIS#29, the data transfer control portion 44 proceeds to step S3 to execute processing from step S3.

In step S6, the data transfer control portion 44 determines whether or not the error code received in step S1 is PxSERR#21. If it is determined that the error code is not PxSERR#21 in step S6, in the next step S7, the data transfer control portion 44 determines whether or not the error code is PxSERR#19. In addition, if it is determined that the error code is not PxSERR#19 in step S7, in the next step S8, the data transfer control portion 44 determines whether or not the error code is PxSERR#16. That is, in steps S6 to S8 (second step), the data transfer control portion 44 determines whether or not the error code is an error indicated by the selected error codes (PxSERR#21, PxSERR#19, and PxSERR#16).

If it is determined that the error code received in step S1 is not the selected error code in any of steps S6 to S8, that is, if the error code reported from the HDD 55 does not coincide with any of the selected error codes, the data transfer control portion 44 proceeds to step S3 to execute processing from step S3. Such a procedure corresponds to a fourth step. On the other hand, if it is determined that the error code coincides with the selected error code, that is, if the error code reported from the HDD 55 coincides with the selected error code, the process proceeds to step S9.

In step S9, the data transfer control portion 44 determines whether or not the reported error code is the one that has been consecutively reported. Such determination is performed by, for example, storing the previous error code in the RAM 43 and comparing the present error code with the previous error code. Here, if the reported error code is not the one that has been consecutively reported, it is considered that the present error code is caused by a bit error due to noise, and therefore, in step S10 (third step), the data transfer control portion 44 performs error recovery processing without performing error processing corresponding to the error. Specifically, the data transfer control portion 44 performs the error recovery processing with respect to the HDD 55 and establishes communication again, to continue the data transfer. That is, so-called retry processing is performed as the error recovery processing. Thereafter, processing from step S1 is executed. It is noted that the error recovery processing is processing of disconnecting the communication with the HDD 55 once and then performing the initial processing again to establish communication with the HDD 55, but is not limited thereto. For example, in the case where, when an error code is reported from the HDD 55, permission of access to the HDD 55 is thereby lost or the access is restricted, processing of recovering the access right or removing the access restriction is also an example of the error recovery processing.

If error information is reported again in step S1, processing of steps S1, S2, and S5 to S8 is performed, and then, in step S9, whether or not an error code indicated by the error information reported in step S1 is the one that has been consecutively reported, is determined. Here, if it is determined that the error code is the one that has been consecutively reported, it is considered that an error of the error code is not due to a bit error but is actually caused in the HDD 55, and therefore, processing from step S3 is performed. On the other hand, if it is determined that the error code is not the one that has been consecutively reported, it is considered that an error of the error code is due to a bit error, and therefore, the error recovery processing (S10) is executed.

As described above, in the multifunction peripheral 1, the data transfer control portion performs the error processing so that, for an error code reported based on a bit error due to noise, processing of recovering the communication with the HDD 55 is performed without performing error processing. On the other hand, if an error actually occurs and an error code is reported, for the reported error code, error processing (S4) corresponding to an error indicated by the error code is performed without performing recovery of the communication. Therefore, recovery of communication is performed only for error report due to a bit error, and error processing is swiftly performed for the other error reports. Thus, when an error actually occurs, unnecessary recovery processing is not performed, and original error processing (S4) that should be executed is swiftly performed after error report. As a result, whether or not an error actually occurs, communication with the HDD 55 can be swiftly recovered when an error code is reported from the HDD 55.

In addition, if an error of the same error code is consecutively reported, it is determined that the error is not due to a bit error but is an error actually caused in the HDD 55, so that error processing corresponding to the error is performed. Thus, even if an actually caused error has been dealt with as being due to a bit error, error processing corresponding to the error is performed later. Therefore, it becomes possible to reliably cope with an error of the HDD 55.

In the above embodiment, an example of application to the HDD 55 has been described, but the present disclosure is not limited thereto. For example, the present disclosure is also applicable to storage devices capable of data communication based on various interface communication standards other than Serial-ATA, such as USB, IEEE 1394, and Ethernet (registered trademark). In addition, the present disclosure is applicable not only to a storage device for wired connection but also to a storage device for wireless connection based on a predetermined wireless communication standard.

In the above embodiment, an example in which the selected error codes for which a bit error is caused by noise such as static electricity are specified as PxSERR#21, PxSERR#19, and PxSERR#16, has been described. This example corresponds to the case where experiments of noise due to static electricity are conducted for the multifunction peripheral 1, so the selected error codes are not limited to the above three error codes.

In the above embodiment, an example of application to the multifunction peripheral 1 has been described. However, the present disclosure is also applicable to an image processing apparatus for processing image data, which is represented by an image reading apparatus such as a scanner or an image forming apparatus such as a printer, or to an information processing apparatus such as a computer for processing various types of data.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:

a communication control portion executed by a processor to communicate with a storage device based on a predetermined interface communication standard, to perform data transfer therewith; and an error code storage portion configured to store one or a plurality of selected error codes selected from a plurality of error codes defined by the interface communication standard, wherein the communication control portion is configured to:

execute processing of acquiring error information outputted from the storage device;

execute processing of determining whether or not an error code indicated by the error information acquired by the acquiring portion coincides with the selected error code stored in the error code storage portion; and upon determining that the error code coincides with the selected error code, communicate again with the storage device to perform the data transfer therewith, and upon determining that the error code does not coincide with the selected error code, execute error processing corresponding to the error code indicated by the error information.

2. The information processing apparatus according to claim 1, wherein if the communication control portion consecutively acquires the error information that coincides with the selected error code, the communication control portion executes error processing corresponding to the error code indicated by the error information without communicating again with the storage portion.

3. The information processing apparatus according to claim 1, wherein the error information includes the error code, and bit information indicating, by 1 bit, a status of an error content indicated by the error code, and the bit information is rewritten when the storage device has received exogenous noise.

4. The information processing apparatus according to claim 1, wherein upon determining that the error code coincides with the selected error code, the communication control portion removes a restriction for the storage device that is based on the error information outputted from the storage device, and then communicates again with the storage device to perform the data transfer therewith.

5. The information processing apparatus according to claim 1, wherein the interface communication standard is Serial-ATA standard, and the selected error code indicates at least one error of CRC (Cyclic Redundancy Check), 10B-to-8B Decode, and PhyRdy (physical layer ready state).

* * * * *